United States Patent [19]
Scholl et al.

[11] Patent Number: 4,528,117
[45] Date of Patent: Jul. 9, 1985

[54] AQUEOUS ISOCYANATE EMULSIONS AND THEIR USE AS BINDERS IN A PROCESS FOR THE PRODUCTION OF SHAPED ARTICLES

[75] Inventors: Hans-Joachim Scholl, Cologne; Helmut Reiff, Leverkusen; Hanns I. Sachs, Cologne, all of Fed. Rep. of Germany

[73] Assignee: Bayer Aktiengesellschaft, Leverkusen, Fed. Rep. of Germany

[21] Appl. No.: 150,488

[22] Filed: May 16, 1980

[30] Foreign Application Priority Data

May 29, 1979 [DE] Fed. Rep. of Germany ....... 2921726

[51] Int. Cl.³ ................. B01J 13/00; C07C 119/042
[52] U.S. Cl. ............... 252/312; 260/453 A; 264/109
[58] Field of Search .................. 252/312; 260/453 A

[56] References Cited

U.S. PATENT DOCUMENTS

| 3,317,481 | 5/1967 | Youker | 252/312 |
| 3,428,592 | 2/1969 | Youker | 252/312 |
| 4,013,701 | 3/1977 | Jabs et al. | 260/453 AR |

FOREIGN PATENT DOCUMENTS

| 1492507 | 5/1969 | Fed. Rep. of Germany | 252/312 |
| 1653177 | 11/1970 | Fed. Rep. of Germany | 252/312 |
| 2703271 | 8/1978 | Fed. Rep. of Germany | 252/312 |
| 2711958 | 9/1978 | Fed. Rep. of Germany | 260/453 AR |
| 2724363 | 11/1978 | Fed. Rep. of Germany | 252/312 |
| 2724364 | 12/1978 | Fed. Rep. of Germany | 252/312 |
| 247588 | 6/1927 | United Kingdom | 252/312 |
| 1523601 | 6/1978 | United Kingdom | 252/312 |

Primary Examiner—Henry R. Jiles
Assistant Examiner—Robert C. Whittenbaugh
Attorney, Agent, or Firm—Gene Harsh; Joseph C. Gil; Thomas W. Roy

[57] ABSTRACT

The present invention relates to aqueous isocyanate emulsions and their use as binders in the production of shaped articles. These emulsions contain (A) from 80 to 20% by weight, based on the total emulsion, of water;
(B) from 18 to 79% by weight, based on the total emulsion, of an organic polyisocyanate;
(C) from 0.5 to 15% by weight, based on the total emulsion of a sulfonic acid corresponding to the formula:

$$R_1\text{-}(SO_3H)_n$$

wherein n represents the integers 1 or 2, and
$R_1$ represents an aromatic hydrocarbon radical containing from 6 to 14 carbon atoms, an aliphatic hydrocarbon radical containing from 10 to 18 carbon atoms, a cycloaliphatic hydrocarbon radical containing from 6 to 15 carbon atoms, an araliphatic hydrocarbon radical containing from 7 to 15 carbon atoms or an alkaromatic hydrocarbon radical containing from 7 to 24 carbon atoms; and (D) from 0 to 10% by weight, based on the polyisocyanate, of a nonionic, surface-active agent as an emulsifier.

9 Claims, No Drawings

AQUEOUS ISOCYANATE EMULSIONS AND THEIR USE AS BINDERS IN A PROCESS FOR THE PRODUCTION OF SHAPED ARTICLES

BACKGROUND OF THE INVENTION

The present invention relates to new aqueous isocyanate emulsions containing an internal mold release agent and their use as binders in the production of shaped articles, in particular panels, preferably made of materials containing lignocellulose.

Pressed materials such as chip boards, composite panels and other shaped articles are usually produced by hot pressing an inorganic or organic raw material such as a composition of wood chips, wood fibers or other material containing lignocellulose with binders such as aqueous dispersions or solutions of urea/formaldehyde or phenol/formaldehyde resins. It is known to use isocyanate solutions as binders for pressed panels instead of urea/formaldehyde or phenol/formaldehyde resins (German Auslegeschrift No. 1,271,984; German Offenlegungsschrift No. 1,492,507 and German Offenlegungsschrift No. 1,653,177).

Processes for the production of panels or shaped articles are also known which involve pressing a mixture of lignocellulose material and an aqueous emulsion of an organic polyisocyanate (German Offenlegungsschriften Nos. 2,610,552; 2,703,271; 2,724,363 and 2,724,364).

Irrespective of their differing dispersibilities and reactivities toward water, known aqueous emulsions used as binders have the general disadvantage of causing separation problems at the interface between the shaped article and pressing tool so that the use of an external release agent is mandatory. Objects of the present invention are to overcome these disavantages and to provide new aqueous, self-releasing isocyanate emulsions.

DESCRIPTION OF THE INVENTION

The present invention relates to emulsions comprising:

(A) from 80 to 20% by weight, based on the total emulsion, of water;

(B) from 18 to 79% by weight, based on the total emulsion, of an organic polyisocyanate;

(C) from 0.5 to 15% by weight, preferably from 0.5 to 5% by weight, based on the total Iemulsion, of a sulfonic acid corresponding to the formula:

wherein
n represents the integers 1 or 2, preferably 1, and
$R_1$ represents an aromatic hydrocarbon radical containing from 6 to 14 carbon atoms, an aliphatic hydrocarbon radical containing from 10 to 18 carbon atoms, a cycloaliphatic hydrocarbon radical containing from 6 to 15 carbon atoms, an araliphatic hydrocarbon radical containing from 7 to 15 carbon atoms or an alkaromatic hydrocarbon radical containing from 7 to 24 carbon atoms; and (D) from 0 to 10% by weight, preferably from 1 to 10% by weight, based on the polyisocyanate of a nonionic, surface-active agent as an emulsifier. Sulfonic acids corresponding to the general formula wherein $R_1$ is an araliphatic hydrocarbon radical containing from 7 to 15 carbon atoms or an alkaromatic hydrocarbon radical containing from 7 to 24 carbon atoms are preferred.

Sulfonic acids corresponding to the above formula in which $R_1$ represents an alkyl-substituted phenyl radical containing a total of from 9 to 20 carbon atoms are particularly preferred. It is also possible, however, to use as release agents those sulfonic acids corresponding to the given formula in which $R_1$ also contains inert substituents such as halogen or nitro groups.

Examples of suitable sulfonic acids include: decane sulfonic acid; octadecane sulfonic acid; benzene sulfonic acid; toluene sulfonic acid; naphthalene sulfonic acid; cyclohexyl sulfonic acid; and in particular, aromatic monosulfonic acids of the type which can be obtained by known methods of sulfonation of alkyl benzenes such as hexyl benzene, dodecyl benzene, octadecyl benzene or mixtures of these compounds.

The invention also relates to a process for the production of shaped articles by the hot pressing of a composition of a comminuted organic and/or inorganic raw material using an aqueous emulsion of the invention as a binder.

Suitable emulsifiers which may be used, optionally in quantities of up to about 10% by weight, based on the isocyanate, to increase the stability of the emulsion of the invention include generally known emulsifiers. Such emulsifiers are described, for example, in German Offenlegungsschrift No. 2,447,135 and U.S. Pat. No. 3,996,154. They include, in particular, compounds corresponding to the formula:

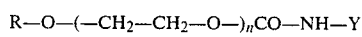

wherein
R represents an alkyl group containing from 1 to 4 carbon atoms,
n represents an integer equal or greater than 5, and
Y represents the radical formed when an NCO group is removed from a polyisocyanate.

The surface-active substances according to German Pat. No. 1,081,225 (U.S. Pat. No. 2,146,767) can also be used. These are alkoxylation products of long-chain monoalcohols, monocarboxylic acids, monoamines, monomercaptans or alkyl monophenols which are reacted with polyisocyanates.

However, new emulsifiers which are the subject of applicants' copending application are preferred in the present invention. These new emulsifiers correspond to the formula:

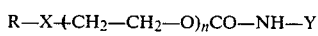

wherein
X represents one of the divalent groups —O—,

—CH₂O— or —S—,
n represents an integer between 10 and 50,
R' represents a $C_1$-$C_3$ alkyl radical,
R represents an aromatic or cycloaliphatic radical having from 2 to 9, preferably from 3 to 6 carbon atoms which optionally contains oxygen or nitrogen as a hetero atom in the ring, and
Y represents a radical of the type formed by removing an isocyanate group from an organic polyisocyanate, preferably the isocyanate which represents component (B) of the emulsion of the present invention.

The new emulsifiers corresponding to the above formula can be produced by reacting monofunctional alcohols corresponding to the formula:

R—X+CH$_2$—CH$_2$—O+$_n$H wherein n, R and X are as defined immediately above, with polyisocyanates containing at least two isocyanate groups, at least one isocyanate group being used for each alcoholic OH group. The reaction products can be dissolved in an excess of polyisocyanate to obtain water emulsifiable polyisocyanates. A large excess of polyisocyanate is preferably used, however, during the reaction of the monofunctional alcohol to produce directly the preferred optional emulsifiers corresponding to the formula:

R—X+CH$_2$—CH$_2$—O)$_n$—CO—NH—Y in the form of a solution in excess polyisocyanate.

The monofunctional alcohols corresponding to the formula R—X+CH$_2$—CH$_2$—O+$_n$H can be obtained using known methods by ethoxylation of compounds corresponding to the formula:

R—X—H wherein
R represents an aromatic or cycloaliphatic radical having from 2 to 9, preferably from 3 to 6 carbon atoms which optionally contains oxygen or nitrogen as a hetero atom in the ring, and
X represents one of the divalent groups —O—, $$\begin{array}{c} R' \\ | \\ -N- \end{array},$$

—CH$_2$O— or —S—.

Examples of preferred starting components for the ethoxylation reaction include: N-methylaniline, N-ethylaniline, cyclohexanol, phenol with optional substituents in the ring, thiophenol with optional substituents in the ring, glycidalcohol with optional substituents in the ring, 3-methyl-oxetane, 3-ethyl-oxetane, 3-butyl-oxetane, furfuryl alcohol and tetrahydrofurfuryl alcohol.

Particularly preferred R—X— structures in the monofunctional polyethylene oxide derivatives corresponding to the formula R—X+CH$_2$—CH$_2$—O)$_n$—H include:

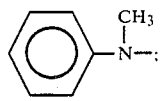

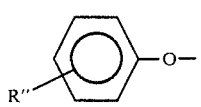

wherein R'' represents CH$_3$—, halogen—, or O$_2$N—;

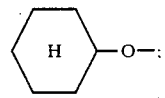

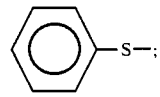

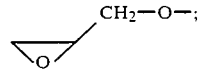

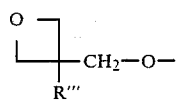

wherein R''' represents —CH$_3$ or —C$_2$H$_5$;

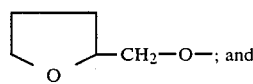

The value of n in the formula R—X+CH$_2$—CH$_2$—O+$_n$H is preferably selected so that a molecular weight of from 500 to 2500 is obtained. A molecular weight ranging from 700 to 2000 is particularly preferred. Thus, n represents, on average, a number between 10 and 50 with n representing a number from 15 to 40 being particularly preferred.

The alcohols corresponding to the formula R—X+CH$_2$—CH$_2$—O+$_n$H are reacted with polyisocyanates, the polyisocyanates preferably in an excess, to form the preferred surface-active agents corresponding to the formula R—X(CH$_2$—CH$_2$—O+$_n$CO—NH—Y, wherein R, X, n and Y are defined as above.

Solutions of the surface-active agents in polyisocyanates are formed if excess quantities of polyisocyanate have been used. These solutions are generally clear and stable in storage but may be colored if industrially produced polyisocyanates are used.

The reaction can take place, for example, by adding the monofunctional alcohol corresponding to the formula R—X+CH$_2$—CH$_2$—O+$_n$H to the polyisocyanate with stirring. In this process, it is advantageous to premelt the alcohols which may be wax-like. The reaction takes place at room temperature when using the preferred polyphenyl polymethylene polyisocyanates. It can be accelerated, however, by heating, for example to temperatures of from 50° to 100° C. Reaction temperatures of between 50° and 80° C. and reaction times of from 1 to 5 hours are preferred.

Suitable isocyanate components for the production of the various emulsifiers include aliphatic, cycloaliphatic, araliphatic, aromatic and heterocyclic polyisocyanates of the type described, for example, by W. Siefken in Justus Liebig's Annalen der Chemie, 562, pages 75 to 136. Examples of suitable polyisocyanates include those corresponding to the formula:

Q(NCO)$_n$ wherein n=from 2 to 4, preferably 2, and

Q represents an aliphatic hydrocarbon radical containing from 2 to 18, preferably from 6 to 10 carbon atoms, a cycloaliphatic hydrocarbon radical containing from 4 to 15, preferably from 5 to 10 carbon atoms, an aromatic hydrocarbon radical containing from 6 to 15, preferably from 6 to 13 carbon atoms, or an araliphatic hydrocarbon radical containing from 8 to 15, preferably from 8 to 13 carbon atoms.

Examples of these polyisocyanates include: ethylene diisocyanate; 1,4-tetramethylene diisocyanate; 1,6-hexamethylene diisocyanate; 1,12-dodecane-diisocyanate; cyclobutane-1,3-diisocyanate; cyclohexane-1,3- and -1,4-diisocyanate as well as mixtures of these isomers; 1-isocyanato-3,3,5-trimethyl-5-isocyanatomethylcyclohexane (German Auslegeschrift No. 1,202,785 and U.S. Pat. No. 3,401,190); 2,4- and 2,6-hexahydrotolylene diisocyanate as well as mixtures of these isomers; hexahydro-1,3- and/or -1,4-phenylene-diisocyanate; perhydro-2,4'- and/or -4,4'-diphenylmethane-diisocyanate; 1,3- and 1,4-phenylene-diisocyanate; 2,4- and 2,6-tolylene-diisocyanate as well as mixtures of these isomers; diphenylmethane-2,4'- and/or -4,4'-diisocyanate; and naphthylene-1,5-diisocyanate.

Examples of other polyisocyanates which can be used in the present invention include: triphenylmethane-4,4',4"-triisocyanate; polyphenyl polymethylene polyisocyanates of the type obtained by aniline formaldehyde condensation with subsequent phosgenation and described, for example, in British Pat. Nos. 874,430 and 848,671; m- and p-isocyanatophenylsulfonyl isocyanates according to U.S. Pat. No. 3,454,606; perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,092,007 (U.S. Pat. No. 3,152,162) and German Offenlegungsschriften Nos. 2,504,400; 2,537,685 and 2,552,350 and norbornane diisocyanates according to U.S. Pat. No. 3,492,330. Suitable polyisocyanates also include polyisocyanates containing allophanate groups of the type described, for example, in British Pat. No. 994,890, Belgian Pat. No. 761,626 and Netherlands patent application No. 7,102,524; polyisocyanates containing isocyanurate groups of the type described, for example, in U.S. Pat. No. 3,001,973, German Pat. Nos. 1,022,789; 1,222,067 and 1,027,394 as well as German Offenlegungsschriften Nos. 1,929,034 and 2,004,048; polyisocyanates containing urethane groups of the type described, for example, in Belgian Pat. No. 752,261 or in U.S. Pat. Nos. 3,394,164 and 3,644,457; polyisocyanates containing acylated urea groups according to German Pat. No. 1,230,778; polyisocyanates containing biuret groups of the type described, for example, in U.S. Pat. Nos. 3,201,372 and 3,124,605 as well as British Pat. No. 889,050. Polyisocyanates produced by telomerization reactions of the type described, for example, in U.S. Pat. No. 3,654,106 as well as polyisocyanates containing ester groups of the type mentioned, for example, in British Pat. Nos. 965,474 and 1,072,956, U.S. Pat. No. 3,567,763 and German Pat. No. 1,231,688 may be used. The reaction products of isocyanates with acetals according to German Pat. No. 1,072,385 and polymeric fatty acid esters according to U.S. Pat. No. 3,455,883 may also be used.

It is also possible to use isocyanate-containing distillation residues from the commercial production of isocyanates, optionally dissolved in one or more of the above polyisocyanates as well as mixtures of the above polyisocyanates.

Examples of particularly preferred polyisocyanates include 2,4- and 2,6-tolylene diisocyanate as well as mixtures of these isomers ("TDI"); polyphenyl polymethylene polyisocyanates of the type produced by aniline formaldehyde condensation with subsequent phosgenation ("crude MDI"); and polyisocyanates containing carbodiimide groups, urethane groups, allophanate groups, isocyanurate groups, urea groups or biuret groups ("modified polyisocyanates"), particularly those modified polyisocyanates which are derived from the 2,4- and/or 2,6-tolylene diisocyanate or from 4,4'- and/or 2,4'-diphenylmethane diisocyanate.

Prepolymers containing terminal NCO groups and having an average molecular weight of from about 300 to 2000 can also be used for the production of the optional emulsifiers which may be used in the invention. Such prepolymers may be obtained by the known reaction of higher molecular weight and/or lower molecular weight polyols with excess polyisocyanate. Examples of suitable higher molecular weight polyols include compounds containing from 2 to 8 hydroxyl groups and having a molecular weight of from 400 to 10,000, preferably from 800 to 5000. Examples of such polyols include polyesters, polyethers, polythioethers, polyacetals, polycarbonates and polyester amides containing at least 2, generally from 2 to 8, but preferably from 2 to 4, hydroxyl groups of the type known for the production of homogeneous and cellular polyurethanes.

Suitable polyesters containing hydroxyl groups include, for example, reaction products of polyhydric, preferably dihydric and optionally trihydric, alcohols with polybasic, preferably dibasic carboxylic acids. The corresponding polycarboxylic acid anhydrides or corresponding polycarboxylic acid esters of lower alcohols or mixtures thereof can also be used instead of the free polycarboxylic acids for the production of the polyesters. The polycarboxylic acids can be of an aliphatic, cycloaliphatic, aromatic and/or heterocyclic nature and can optionally be substituted, for example, by halogen atoms and/or unsaturated.

Examples of suitable carboxylic acids and their derivatives for the preparation of the polyesters include: succinic acid; adipic acid; suberic acid; azelaic acid; sebacic acid; phthalic acid; isophthalic acid; trimellitic acid; phthalic acid anhydride; tetrahydrophthalic acid anhydride; hexahydrophthalic acid anhydride; tetrachlorophthalic acid anhydride; endomethylenetetrahydrophthalic acid anhydride; glutaric acid anhydride; maleic acid; maleic acid anhydride; fumaric acid; dimerized and trimerized unsaturated fatty acids, optionally mixed with monomeric unsaturated fatty acids such as oleic acid; terephthalic acid dimethyl ester and terephthalic acid bis-glycol ester.

Examples of suitable polyhydric alcohols for the preparation of the polyesters include: ethylene glycol; propylene glycol-(1,2) and -(1,3); butylene glycol-(1,4) and -(2,3); hexane diol-(1,6); octane diol-(1,8); neopentyl glycol; 1,4-bis-hydroxymethyl cyclohexane; 2-methyl-1,3-propane diol; glycerine; trimethylol propane; hexane triol-(1,2,6); butane triol-(1,2,4); trimethylol ethane; pentaerythritol; quinitol; mannitol; sorbitol; formitol; methylglycoside; diethylene glycol; triethylene glycol; tetraethylene glycol and higher polyethylene glycols;

dipropylene glycol and higher polypropylene glycols as well as dibutylene glycol and higher polybutylene glycols.

The polyesters can contain a proportion of terminal carboxyl groups. Polyesters of lactones, for example, ε-caprolactone or hydroxy carboxylic acids, for example, ω-hydroxycaproic acid can also be used.

Polyethers which can be used for the preparation of the prepolymers for the invention contain at least 2, generally from 2 to 8 and preferably 2 or 3, hydroxyl groups. Such polyethers include those produced, for example, by self-polymerization of epoxides such as ethylene oxide, propylene oxide or epichlorohydrin, for example, in the presence of Lewis catalysts such as $BF_3$, or by addition of these epoxides such as ethylene oxide and propylene oxide, optionally in admixture or in succession, to starting components containing reactive hydrogen atoms. Examples of suitable starting components include water, alcohols, ammonia or amines. Specific examples include: ethylene glycol; propylene glycol-(1,3) or -(1,2); trimethylol propane; glycerine; sorbitol; 4,4'-dihydroxy-diphenylpropane; aniline; ethanolamine and ethylene diamine. Sucrose polyethers of the type described, for example, in German Auslegeschriften Nos. 1,176,358 and 1,064,938 as well as polyethers which are started on formitol or formose (German Offenlegungsschriften Nos. 2,639,083 and 2,737,951) can also be used in the invention. In many cases, those polyethers are preferred which contain predominantly primary OH groups (i.e. up to 90% by weight based on all OH groups present in the polyether). Polybutadienes containing OH groups may also be used for the present invention.

Suitable polythioethers preferably include the self-condensation products of thiodiglycol and/or the condensation products of thiodiglycol with other glycols, dicarboxylic acid, formaldehyde, aminocarboxylic acids or amino alcohols. Depending on the co-components, the condensation products are, for example, polythio mixed ethers, polythioether esters or polythioether ester amides.

Examples of suitable polyacetals include the compounds which can be produced from glycols such as diethylene glycol; triethylene glycol; 4,4'-dioxethoxy-diphenyldimethylmethane; hexane diol and formaldehyde. Suitable polyacetals can also be produced by polymerization of cyclic acetals such as trioxane (German Offenlegungsschrift No. 1,694,128).

Polycarbonates containing hydroxyl groups include known compounds which can be produced, for example, by the reaction of diols such as propane diol-(1,3); butane diol-(1,4) and/or hexane diol-(1,6); diethylene glycol; triethylene glycol; tetraethylene glycol or thiodiglycol with diaryl carbonates such as diphenyl carbonate or phosgene (German Auslegeschriften Nos. 1,694,080; 1,915,908 and 2,221,751 and German Offenlegungsschrift No. 2,605,024).

The polyester amides and polyamides include, for example, the predominantly linear condensates obtained from polybasic saturated or unsaturated carboxylic acids or their anhydrides and polyhydric saturated or unsaturated amino alcohols, diamines, polyamines and mixtures thereof.

Polyhydroxyl compounds already containing urethane or urea groups as well as optionally modified natural polyols such as castor oil or carbohydrates such as starch can also be used. Addition products of alkylene oxides to phenol formaldehyde resins or to urea formaldehyde resins can also be used according to the present invention.

Suitable lower molecular weight polyols (molecular weight of from 62 to 400) include, for example, the compounds mentioned above as starting components for the production of the higher molecular weight polyols.

The organic polyisocyanate, sulfonic acid, water and optionally nonionic surface-active emulsifiers are mixed to produce the emulsions of the present invention. In a preferred embodiment, the sulfonic acid and optionally the emulsifier are premixed in the polyisocyanate and the emulsification with water is carried out afterwards by conventional emulsification methods.

In industrial plants, the emulsions can also be produced by mixing the starting components in special mixing assemblies such as static mixers, stirrer mixing heads, dispersion machines and Supraton units.

Isocyanate components which are suitable for the organic polyisocyanates (component B) of the present invention include all the polyisocyanates described previously in connection with the production of the optional emulsifier providing the polyisocyanates are liquid at the processing temperatures and preferably at room temperature. The isocyanates used for component B and for the optional emulisifier preferably are the same since the emulsifier is produced directly in situ in the polyisocyanate by introducing the monoalcohol having the ethylene oxide sequence.

The emulsions of the present invention are used as binders preferably for materials containing lignocellulose. The emulsions which have proven especially suitable as binders include those whose isocyanate component (see German Offenlegungsschrift No. 2,711,598) is the phosgenation product of the undistilled bottom fraction of the type produced during the removal of from 25 to 90% by weight, preferably from 30 to 85% by weight of 2,2'-, 2,4'-and/or 4,4'-diamino diphenyl-methane from an aniline formaldehyde condensate. Especially suitable emulsions also include those whose isocyanate component is the undistilled bottom fraction of the type obtained during the removal of from 25 to 90% by weight, preferably from 30 to 85% by weight of 2,2'-, 2,4'- and/or 4,4'-diisocyanato-diphenylmethane from the crude phosgenation product of an aniline/formaldehyde condensate. The isocyanate component of these crude phosgenation products contains from 35 to 70% by weight, preferably from 45 to 60% by weight, of diisocyanato-diphenylmethanes, wherein the content of 2,4'-diisocyanato-diphenylmethane amounts to between 1 and 8% by weight, preferably between 2 and 5% by weight and the content of 2,2'-diisocyanato-diphenylmethane amounts to between 0 and 2% by weight. The isocyanate components of these phosgenation products have viscosities at 25° C. of from 50 to 600 mPas, preferably from 200 to 500 mPas and an NCO content of between 28 and 32% by weight.

Bottom fractions of this type can be obtained, for example, during the removal of from 45 to 90% by weight, preferably from 55 to 85% by weight of 4,4'-diisocyanato-diphenylmethane from a crude diphenylmethane diisocyanate containing more than 85% by weight, preferably more than 90% by weight, of 4,4'-diisocyanato-diphenylmethane. Such crude diphenylmethane diisocyanate can be obtained, for example, by the process described in German Offenlegungsschrift No. 2,356,828.

Another possible method involves distilling from 25 to 80% by weight, preferably from 30 to 60% by weight of 2,4'-diisocyanato-diphenylmethane and optionally 4,4'- or 2,2'-diisocyanato-diphenylmethane from a crude phosgenation product having a content of diisocyanato-diphenylmethane isomers of from 60 to 90% by weight, preferably from 65 to 75% by weight, the diisocyanato-diphenylmethane containing from 20 to 60%, preferably from 30 to 40%, by weight of 2,4'-isomers. Distillation can be carried out so that the residues have the desired compositions.

It is also possible to obtain the desired isomer and oligomer compositions of the polyisocyanate mixture by blending various bottom fractions.

Examples of suitable raw materials containing lignocellulose which can be used with the emulsions of the present invention include: wood, bark, cork, bagasse, straw, bamboo, alfalfa, rice husks, sisal and coconut fibers. The raw material can be present in the form of granules, chips, fibers or dust and can have a water content of, for example, from 0 to 35% by weight, preferably from 5 to 25% by weight. The raw material is reacted with the binder in a quantity of from 1 to 100, preferably from 2 to 12% by weight and pressed into panels or shaped articles generally with pressure and heat.

Multilayer panels or shaped articles can also be produced from veneers, papers or fabrics in a similar manner. Multilayer panels or shaped articles can also be produced from veneers and central layers in the form of strips, bars or small rods (so-called coreboards) by treating the veneers with the polyisocyanate emulsion in the manner described above and then pressing the veneers to the central layers generally at elevated temperature and elevated pressure. Temperatures of from 100° to 250° C., preferably from 130° to 200° C., are maintained in this process. The initial pressure used is preferably between 5 and 150 bars with the pressure usually falling towards 0 during the course of the pressing process.

Pressed articles can be produced using the present invention, however, from other organic raw materials such as plastic scraps of any type and/or inorganic raw materials such as expanded mica or silicate beads.

The material to be bonded is mixed with the emulsions of the invention, preferably by fine spraying the material with the aqueous emulsion binder to achieve as homogeneous a distribution of the binder as possible. The material is then hot pressed under the conditions indicated above and the pressed article removed from the mold. Use of the emulsions of the invention permits simple and easy removal of the article from the mold. The emulsions of the invention surprisingly impart a self-releasing effect between the pressed articles and the mold. What causes the surprising self-releasing capacity provided by the aqueous emulsions of the invention is at present not understood.

The polyisocyanate emulsions of the invention can be used in combination with the polyhydroxyl compounds described above in an NCO/OH ratio of between 1:2 and 10:1, preferably from 1.5:1 to 1:1 in the process of the invention. The two components may be used separately or as a reactive mixture. These combinations of polyisocyanate and polyhydroxyl compounds are important, for example, as binders for granulated cork. It is also possible to add known blowing agents in a quantity of from about 0.5 to 30% by weight, based on the weight of binder or impregnating material and/or other additives which influence the formation of foam or the chemical reaction between polyisocyanates, lignocellulose-containing material and optionally polyhydroxyl compound. Such other additives include, for example, stabilizers, catalysts and activators and may be used in a quantity of from 0.05 to 10% by weight, based on the weight of binder or impregnating agent.

The polyisocyanate emulsions used as binders according to the present invention can also be combined with aqueous solutions of condensation products of formaldehyde with urea and/or melamine and/or phenol. These condensation products have been used predominantly in the timber product industry. The polyisocyanate emulsions may also be used with other less common binders and impregnating agents such as those based on PVAC latex, sulfite liquor or tannin. A mixing ratio of the binders of the invention with these additional binders can be maintained between 1:20 and 20:1, preferably between 1:5 and 5:1. The polyisocyanate emulsions and the additional binders may be used either separately or in admixture.

These combinations are particularly advantageous in the production of multilayer panels having specific properties. For example, the external layers of the panels can be reacted with the polyisocyanate emulsions of the invention (alone or together with conventional adhesives) and one or more internal layers can be reacted with conventional adhesives (alone or together with the polyisocyanate emulsion) and then pressed together.

The panels or shaped articles produced using the process of the invention and based on lignocellulose-containing or other organic and/or inorganic raw materials are especially suitable for use in the construction industry due to their excellent mechanical properties. To impart to the panels or shaped articles resistance against attack by fungus, insects or fire, it is possible to add to the binders conventional commercial organic or inorganic protection agents in pure form or in solution form in quantities of from about 0.05 to 30% by weight, preferably from 0.5 to 20% by weight, based on the lignocellulose-containing raw materials. Suitable solvents include water and organic solvents such as residual oil from processing petroleum and chlorinated hydrocarbons among others. The bonding quality generally is not impaired by using these materials. In contrast to panels bonded with phenol/formaldehyde resin, materials produced using the process of the invention neither effloresce nor "bleed".

Substantial improvements can be achieved in the mechanical and toxicological properties of the panels during chip board production when processing is done using the isocyanate emulsions of the invention when compared to processing with conventional binders based on phenol/formaldehyde or urea/formaldehyde resins.

Thus, it is possible to obtain an improvement in the flexural strength of chip board panels of up to 50% using the same quantity of binder as with phenol/formaldehyde or urea/formaldehyde resins in addition to improvements in other mechanical properties. Or, it is possible to obtain the same range of mechanical properties with a 25 to 70% reduction in binder concentration using the emulsions of the invention as compared to using phenol/formaldehyde or urea/formaldehyde resins. In addition, panels produced according to the invention do not emit formaldehyde or other noxious gases. Optimum material properties can be achieved especially when a polyphenyl polymethylene polyisocyanate having the viscosity and isomer distribution defined above is used in the emulsion.

It does not matter whether the polyisocyanate mixture has been produced by distillation of 2,4'- and/or 4,4'-diisocyanato-diphenylmethane from crude diphenylmethane diisocyanate or similarly by separation of pure diamine diphenylmethane from crude diaminodiphenylmethane with subsequent phosgenation of the undistilled bottom fraction of polyarylamines thus obtained.

If the polyisocyanate contains more than 75% by weight of diisocyanato-diphenylmethanes, the quality of chip board is substantially impaired. On the other hand, if the diisocyanato-diphenylmethane content falls below 35% by weight, the binder mixture generally becomes too viscous at room temperature to be properly emulsified.

The following Examples illustrate the invention. Numerical data should be interpreted as parts by weight or percentages by weight unless otherwise indicated.

The following starting products have been used in the Examples:

Polyisocyanate I

Sufficient diisocyanato-diphenylmethane is distilled from the crude phosgenation product of an aniline/formaldehyde condensate for the distillation residue to have a viscosity of 200 cP at 25° C. (2-nuclear content: 44.3%; 3-nuclear content: 23.5%; content of higher nuclear polyisocyanates: 32.2%).

Polyisocyanate II

The polyisocyanate is produced in a similar manner to the preparation of Polyisocyanate I and has a viscosity of 300 cP/25° C. (2-nuclear content: 60%; NCO content: 30%).

Emulsifier 1

Ethoxylated n-butanol with an average molecular weight of 1200.

Emulsifier 2

Ethoxylated N-methyl aniline with an average molecular weight of 1000.

Emulsifier 3

Ethoxylated 3-ethyl-3-hydroxymethyl oxetane with an average molecular weight of 1191.

Sulfonic Acid

Commercial alkyl benzene sulfonic acid (Marlon AS3 which is a commercial product made by the Chemische Werke Huls AG, Federal Republic of Germany) having the following component distribution:
$C_{10}$: about 5%
$C_{11}$: about 45–50%
$C_{12}$: about 35–40%
$C_{13}$: about 10–15%
$C_{14}$: about 1%

EXAMPLES

EXAMPLE 1

436 g of an emulsion produced continuously using a stirrer mixing head and consisting of 218 g of water, 192 g of polyisocyanate I 11 g of emulsifier 1 and 15 g of sulfonic acid are mixed with 2800 g of an industrially produced pine wood/deciduous wood chip mixture having a moisture content of 2%. A shaped article is formed from the material on a steel sheet which has not been treated with release agent and is pressed for two minutes at a heating plate temperature of 170° C. and an initial pressure of 25 bar.

A chip panel is obtained which frees itself perfectly from the sheet and heating plate, immediately after the press has been opened and which exhibits excellent mechanical properties.

A comparison chip panel produced using the same process but without using the sulfonic acid adheres strongly to the sheet and heating plate.

EXAMPLE 2

1410 g of an emulsion produced continuously using an HK mixer head and consisting of 940 g of water, 420 g of polyisocyanate I, 25 g of emulsifier 2 and 25 g of sulfonic acid are mixed with 1200 g of industrially prepared sugar cane bagasse having a moisture content of 2%. A transporting pallet is produced from the material under pressure and heat in a steel mold and can be removed easily when the press is opened. The pallet is far superior in its mechanical properties to a pallet which has been bonded using a conventional urea/formaldehyde resin.

EXAMPLE 3

2900 g of an industrially produced chip mixture sample from a particle board plant having a moisture content of 6% is mixed with 242 g of a 45% aqueous phenol/formaledhyde resin solution and an emulsion produced in a beaker using a wooden stirring rod and consisting of 30 g of water, 55 g of 50% aqueous paraffin dispersion (Mobilar 161 made by the company, Mobil Oil AG), 105 g of polyisocyanate II, 5 g of emulsifier 3 and 4 g of sulfonic acid.

A shaped article is produced from the material on a steel sheet which has not been treated with any release agent and is pressed for two minutes at a heating plate temperature of 170° C. and an initial pressure of 25 bars. A chip panel which releases itself perfectly from the sheet and heating plate immediately after the press is opened and having excellent mechanical properties is obtained.

What is claimed is:

1. An emulsion comprising:
(A) from 80 to 20% by weight, based on the total emulsion, of water;
(B) from 18 to 79% by weight, based on the total emulsion, of an organic polyisocyanate;
(C) from 0.5 to 15% by weight, based on the total emulsion, of a sulfonic acid corresponding to the formula:

$$R_1 \text{\textendash} (SO_3H)_n$$

wherein
n represents the integers 1 or 2 and
$R_1$ represents an aromatic, hydrocarbon radical containing from 6 to 14 carbon atoms, an aliphatic hydrocarbon radical containing from 10 to 18 carbon atoms, a cycloaliphatic hydrocarbon radical containing from 6 to 15 carbon atoms, an araliphatic hydrocarbon radical containing from 7 to 15 carbon atoms or an alkaromatic hydrocarbon radical containing from 7 to 24 carbon atoms; and
(D) from 0 to 10% by weight, based on the polyisocyanate, of a nonionic, surface-active agent as an emulsifier.

2. An emulsion as claimed in claim 1 wherein $R_1$ for said sulfonic acid represents an araliphatic hydrocarbon radical containing from 7 to 15 carbon atoms or an alkaromatic hydrocarbon radical containing from 7 to 24 carbon atoms.

3. An emulsion as claimed in claim 1 wherein n and $R_1$ in the formula for said sulfonic acid respectively represent 1 and an alkyl substituted phenyl radical containing from 9 to 20 carbon atoms.

4. An emulsion as claimed in claim 1 wherein said organic polyisocyanate comprises a phosgenation product of an undistilled bottom fraction of the type obtained during removal of from 25 to 90% by weight of 2,2'-, 2,4'- and/or 4,4'-diamino-diphenylmethane from an aniline/formaldehyde condensate, or an undistilled bottom fraction of the type obtained during removal of from 25 to 90% by weight of 2,2'- and/or 4,4'-diisocyanato-diphenylmethane from a crude phosgenation product of an aniline/formaldehyde condensate, said organic polyisocyanate having a viscosity at 25° C. of from 50 to 600 mPas, an NCO content of between 28 and 32% by weight and containing a total of from 35 to 70% by weight of diisocyanato-diphenylmethanes of which from 1 to 8% by weight is 2,4'-diisocyanato-diphenylmethane and from 0 to 2% is 2,2'-diisocyanato-diphenylmethane.

5. An emulsion as claimed in claim 3 wherein said organic polyisocyanate comprises a phosgenation product of an undistilled bottom fraction of the type obtained during removal of from 25 to 90% by weight of 2,2'-, 2,4'- and/or 4,4'-diamino-diphenylmethane from an aniline/formaldehyde condensate, or an undistilled bottom fraction of the type obtained during removal of from 25 to 90% by weight of 2,2'- and/or 4,4'-diisocyanato-diphenylmethane from a crude phosgenation product of an aniline/formaldehyde condensate, said organic polyisocyanate having a viscosity at 25° C. of from 50 to 600 mPas, an NCO content of between 28 and 32% by weight and containing a total of from 35 to 70% by weight of diisocyanato-diphenylmethanes of which from 1 to 8% by weight is 2,4'-diisocyanato-diphenylmethane and from 0 to 2% is 2,2'-diisocyanato-diphenylmethane.

6. An emulsion as claimed in claim 1 wherein said organic polyisocyanate comprises a polyisocyanate obtained by distillation of from 45 to 90% by weight of 4,4'-diphenylmethane diisocyanate from a crude diphenylmethane diisocyanate containing more than 85% by weight of pure diphenylmethane diisocyanate as the bottom fraction, or which has been obtained by phosgenation of an undistilled bottom fraction of the type formed during distillation of from 45 to 90% by weight of 4,4'-diamino-diphenylmethane from a crude diamino-diphenylmethane containing more than 85% by weight of diamino-diphenylmethane.

7. An emulsion as claimed in claim 3 wherein said organic polyisocyanate comprises a polyisocyanate obtained by distillation of from 45 to 90% by weight of 4,4'-diphenylmethane diisocyanate from a crude diphenylmethane diisocyanate containing more than 85% by weight of pure diphenylmethane diisocyanate as the bottom fraction, or which has been obtained by phosgenation of an undistilled bottom fraction of the type formed during distillation of from 45 to 90% by weight of 4,4'-diamino-diphenylmethane from a crude diamino-diphenylmethane containing more than 85% by weight of diamino-diphenylmethane.

8. An emulsion as claimed in claim 1 wherein said organic polyisocyanate comprises a polyisocyanate obtained by distillation of from 25 to 80% by weight of 2,4'- and optionally 4,4'-diisocyanato-diphenylmethane from a crude diphenylmethane diisocyanate having a content of 60 to 90% by weight of diisocyanato-diphenylmethane isomers, said diisocyanato-diphenylmethane isomers containing from 20 to 60% by weight of 2,4'-isomers, or a polyisocyanate obtained by phosgenation of an undistilled bottom fraction of the type formed during distillation of from 25 to 80% by weight of 2,4'- and optionally 4,4'-diamino-diphenylmethane from a crude diamino-diphenylmethane containing from 20 to 60% by weight of 2,4'-diamino-diphenylmethane.

9. An emulsion as claimed in claim 3 wherein said organic polyisocyanate comprises a polyisocyanate obtained by distillation of from 25 to 80% by weight of 2,4'- and optionally 4,4'-diisocyanato-diphenylmethane from a crude diphenylmethane diisocyanate having a content of 60 to 90% by weight of diisocyanato-diphenylmethane isomers, said diisocyanato-diphenylmethane isomers containing from 20 to 60% by weight of 2,4'-isomers, or a polyisocyanate obtained by phosgenation of an undistilled bottom fraction of the type formed during distillation of from 25 to 80% by weight of 2,4'- and optionally 4,4'-diamino-diphenylmethane from a crude diamino-diphenylmethane containing from 20 to 60% by weight of 2,4'-diamino-diphenylmethane.

\* \* \* \* \*